United States Patent
Penaflor et al.

(10) Patent No.: US 10,082,725 B1
(45) Date of Patent: Sep. 25, 2018

(54) UNIVERSAL OPTICAL LIGHTING ACCESSORY FOR MOBILE PHONE DEVICES WITH BACKSIDE CAMERA AND FLASH

(71) Applicants: Ronaldo Green Penaflor, Fallbrook, CA (US); Ronaldo Narvaza Penaflor, Fallbrook, CA (US)

(72) Inventors: Ronaldo Green Penaflor, Fallbrook, CA (US); Ronaldo Narvaza Penaflor, Fallbrook, CA (US)

(73) Assignee: iP TECH PROS Inc., San Diego, CA (US)

( * ) Notice: Subject to any disclaimer, the term of this patent is extended or adjusted under 35 U.S.C. 154(b) by 0 days.

(21) Appl. No.: 15/942,798

(22) Filed: Apr. 2, 2018

Related U.S. Application Data

(63) Continuation-in-part of application No. 15/886,845, filed on Feb. 2, 2018, now Pat. No. 10,012,888, and a continuation-in-part of application No. 15/919,211, filed on Mar. 13, 2018.

(51) Int. Cl.
*G03B 15/06* (2006.01)
*H04B 1/3827* (2015.01)
*G03B 17/56* (2006.01)

(52) U.S. Cl.
CPC ........... *G03B 15/06* (2013.01); *G03B 17/565* (2013.01); *H04B 1/3833* (2013.01)

(58) Field of Classification Search
CPC ..... G03B 15/06; G03B 17/565; H04B 1/3833
See application file for complete search history.

(56) References Cited

U.S. PATENT DOCUMENTS

2018/0054565 A1* 2/2018 Smith ................ H04N 5/23222

* cited by examiner

*Primary Examiner* — David V Bruce

(57) ABSTRACT

A universal optical lighting accessory is described for use with different types of handheld mobile devices in photography or videography applications. Each of the different types of handheld mobile devices includes at least a rear-facing camera and a light source having different placement configurations. The universal optical lighting accessory includes at least a body, an attachment member for coupling and securing the body to the backside of each of the different types of handheld mobile devices, a guide rail coupled to body, an optical housing having an attachment and sliding mechanism, and a light filter element, the universal optical lighting accessory configured to adapt to each light source having different placement configurations.

17 Claims, 18 Drawing Sheets

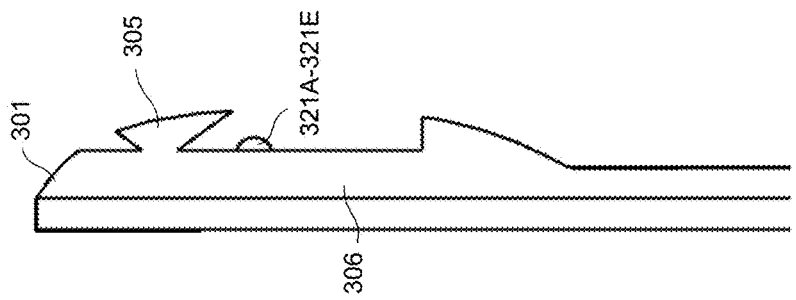
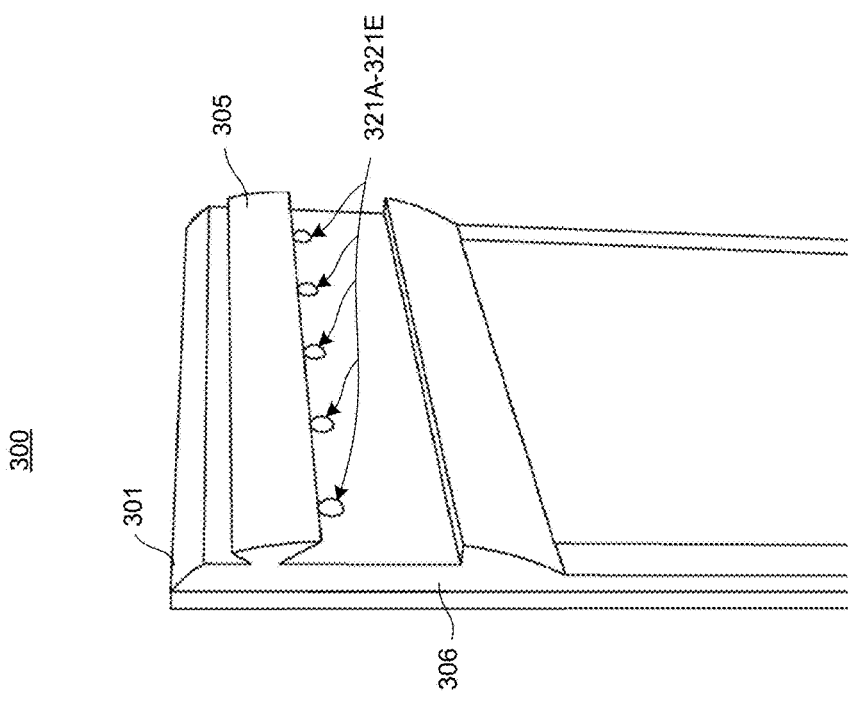
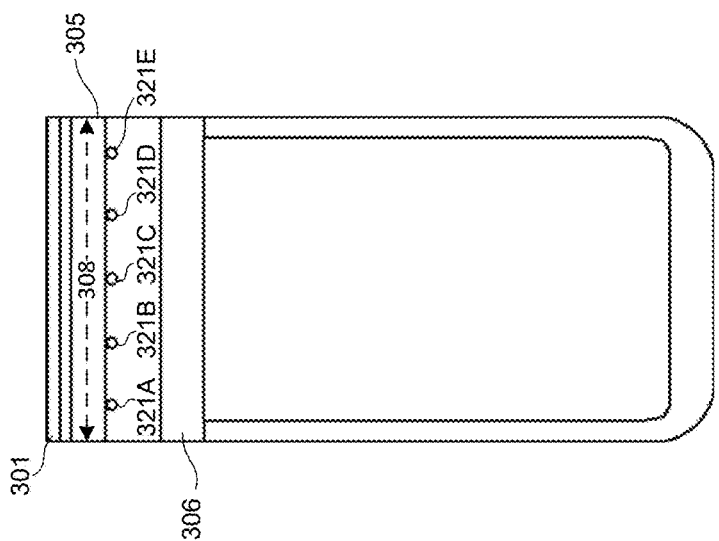
FIG. 5C
FIG. 5B
FIG. 5A

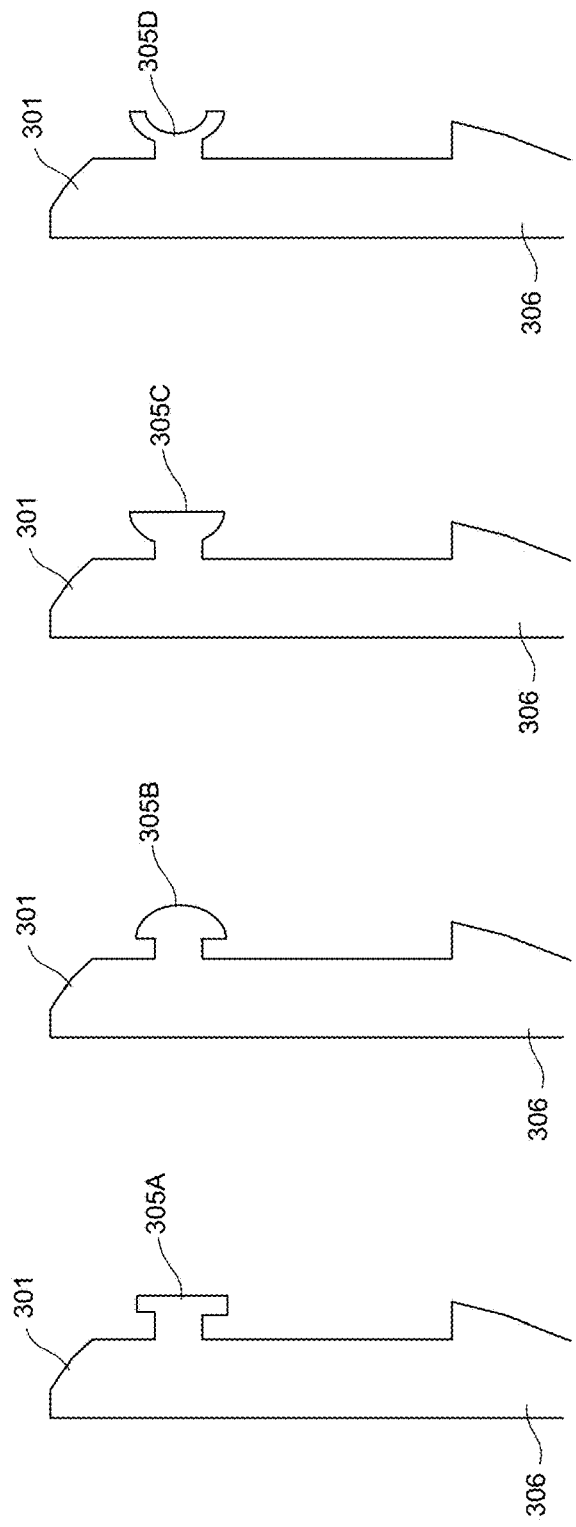

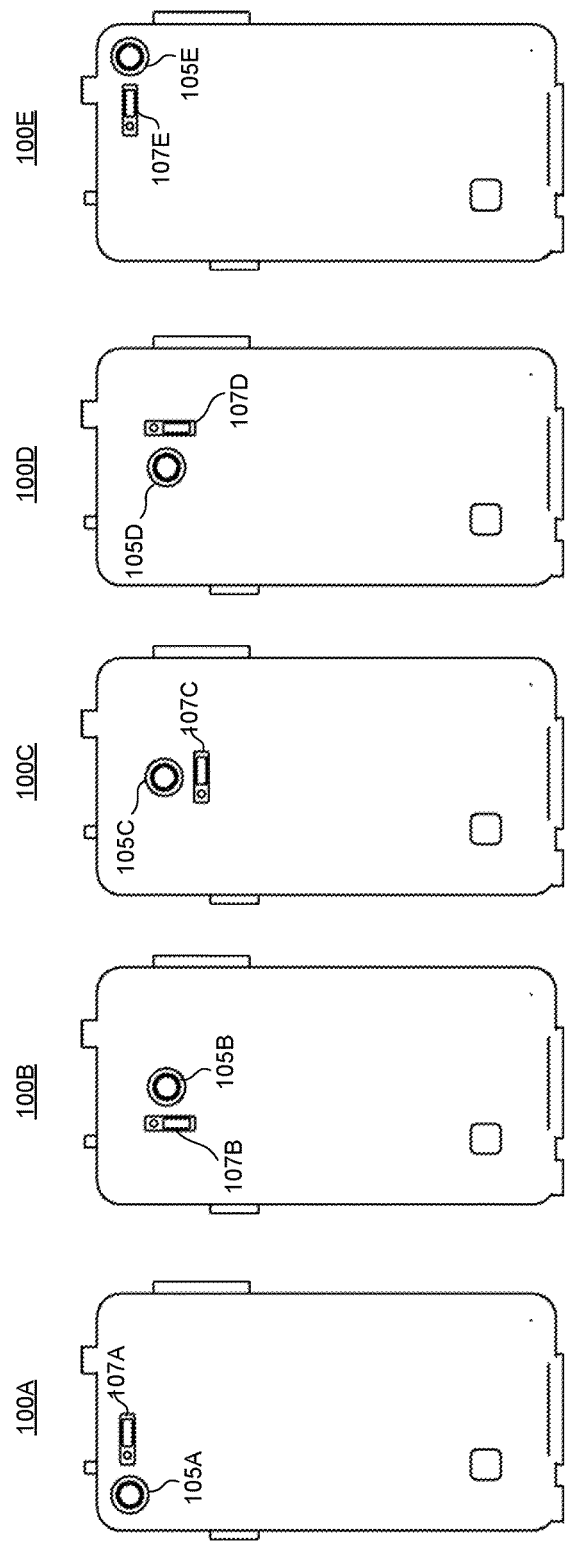

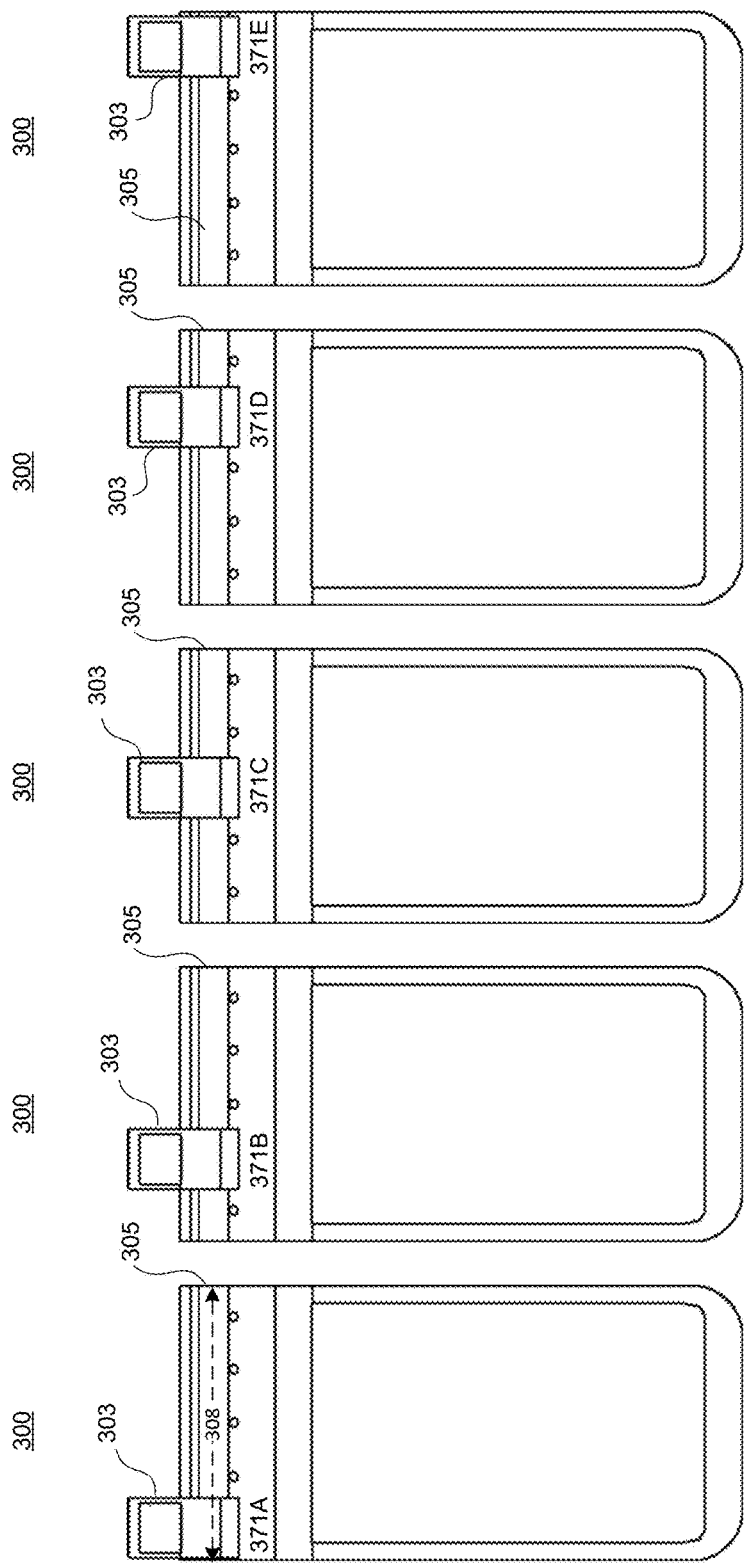

UNIVERSAL OPTICAL LIGHTING ACCESSORY FOR MOBILE PHONE DEVICES WITH BACKSIDE CAMERA AND FLASH

RELATED APPLICATIONS

This application claims the benefit of priority of U.S. application Ser. No. 15/886,845, filed Feb. 2, 2018, and U.S. application Ser. No. 15/919,211, filed Mar. 13, 2018, which are herein incorporated by reference to the present application.

FIELD OF THE INVENTION

The present invention relates to a universal optical lighting accessory for smartphones or portable handheld mobile devices used in photography or videography. Particularly, the universal optical lighting accessory is dynamically adapted to fit various smartphones having different LED flash placement configurations, expanding the lighting capabilities of many types of smartphones or portable handheld mobile devices for selfie photography and videography applications.

BACKGROUND

The popularity of social media has increased over the years and has made handheld portable phones a powerful communication and multimedia tool with powerful camera capabilities used in both photography and videography application. Current handheld portable devices such as smartphones and handheld mobile phones are equipped with sophisticated cameras (rear and front-facing) and a front facing touchscreen display screen for viewing live images to capture in either video mode or photography mode. A self-portrait photograph or "selfie" is accomplished by a user using the front-facing camera or rear-facing camera of the smartphone and directing the camera facing the user, while holding the smartphone in the hand at arm's length or supported by a selfie stick.

When capturing images, daylight conditions or areas that are adequately lit with artificial lighting provide the necessary lighting to capture subject at adequate exposure levels. However, in dark or poorly lit conditions, additional lighting is a necessity to provide the fill-in lighting or flash needed to capture the subject at the desired exposure levels. Most smartphones today are only equipped with a single flash making it difficult, if not impossible, to take selfies at night or in poorly lit areas. To address these sorts of lighting issues of taking selfies in poor lighting conditions, several lighting products have emerged in the marketplace including, for example, LED fill flash clips, ring-light flash, and cases with built-in LED lighting.

One such illumination apparatus for taking selfies on mobile devices is exemplified by U.S. Pat. No. 9,464,796, incorporated by reference herein in its entirety. This application generally teaches an illumination device generally that has a light source and an attachment assembly that connects the light source to the computing device. Another such lighting device apparatus for mobile devices is exemplified by U.S. Patent Application Publication No. US20170324438, incorporated by reference herein in its entirety. This application generally teaches a mobile device case, such as for a mobile phone, which has lighted panels that fold inwardly from an edge of the case. Yet another such lighting device apparatus for mobile devices is exemplified by U.S. Patent Application Publication No. US20160209025, incorporated by reference herein in its entirety. This application generally teaches a lighting device attachment for a mobile device having a housing that defines a cavity or an external coupling member configured to receive the mobile device, a light source within the housing, and an optical element adapted to project light from the light source to illuminate an external scene. The above patent documents generally discuss external lighting devices having external light sources and power sources that require electrical components to power and control the lighting devices such as an secondary LED flash.

One type of optical accessory for mobile devices is exemplified by U.S. Patent Application Publication No. US20170026499, incorporated by reference herein in its entirety. This application generally describes an attachment for use with a mobile device with an imaging device or with a case for the mobile device, and in particular to a system for scanning a barcode using a smartphone and other mobile devices. Another type of optical accessory for mobile devices is exemplified by U.S. Patent Application Publication No. US 20160296111, incorporated by reference herein in its entirety. This application generally teaches an optical accessory, which can be associated with a mobile device such as a smartphone or tablet, and in particular the optical accessory comprises coupling means to be functionally attached to the mobile device thereby substantially forming an ophthalmoscope.

Various illumination and flash fill devices for taking selfies using handheld mobile devices such as smartphones are known in the art as presented hereinabove, requiring electronic components and different in form and function from the present disclosure. Similarly, optical accessories for mobile devices do exist in various fields, but they are more complex in function and mechanically different than the present disclosure, and do not provide any novel solutions to the illumination problems described by the present disclosure.

SUMMARY

It is an advantage of the present invention to provide universal optical lighting accessory for use with different handheld mobile devices each having a front side, a backside, a rear-facing camera located on the backside, and a light source located on the backside, each of the different handheld mobile devices has a different light source placement configuration, the universal optical lighting accessory having a body; an attachment member for coupling and securing the body to the backside of the different handheld mobile devices; a guide rail coupled to body; an optical housing slidably coupled to the guide rail, the optical housing is mechanically adjustable to engage the different light source placement configuration and receive light rays communicated by the light source of the different handheld mobile devices; and a light filter element coupled to the optical housing, the light filter element transforms the light rays communicated by the light source into a filtered light source, the light filter element is configured to communicate the filtered light source to the rear-facing camera of different handheld mobile devices.

It is another advantage of the present invention to provide an optical element coupled to an interior cavity formed in the optical housing. In another aspect, the optical element may be a transparent polyhedron light pipe. In yet aspect, the light source may be an LED flash.

In one embodiment, the optical housing may include a first interlocking mechanism configured to interlock to second interlocking mechanism formed on the guide rail.

In another embodiment, the universal optical lighting accessory includes ball plungers which may be used for setting the optical housing at discreet incremental positions along the guide rail.

In yet another embodiment, the different light source placement configuration may include a first light source placement, the first light source placement located at an upper left corner defined on a first handheld mobile device; a second light source placement, the second light source placement located near a point slightly left of an upper center point defined on a second handheld mobile device; a third light source placement, the third light source placement located near an upper center point defined on a third handheld mobile device, a fourth light source placement, the fourth light source placement located near a point slightly right of the upper center point defined on a fourth handheld mobile device; and a fifth light source placement, the fifth light source placement located at an upper right corner defined on a fifth handheld mobile device. 14.

In one aspect, a centerline of the body may coincides and may be configured to align with a centerline defined on each of the different handheld mobile devices.

In another aspect, the light filter element may include a diffusion filter, a UV black light filter, a color filter, or a combination thereof. In yet another aspect, the universal optical lighting accessory may be used for selfie photography or selfie videography.

Other advantages of the novel optical lighting accessory apparatus include 1) provide filtered lighting to the backside high resolution camera without the use or need of additional external power sources or electronic components; 2) provide a vanity mirror on the backside of the handheld mobile device; 3) provide a source of illumination for the vanity mirror; 4) convert the high intensity LED flash into a filtered light source, making it ideal for taking selfies with the backside camera and LED flash at night or in poorly lit areas by providing a uniform and mild intensity light source; 5) achieve a body configuration having a slim and slender profile, providing the user and ergonomic and comfortable fit when attached to the smartphone; 6) ability to easily support a variety of smartphones having different placement configurations of the backside camera and the LED flash as defined by different manufacturers.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 5A-FIG. 5C illustrate a front full view, a close-up side perspective view of the top portion, and a close-up side profile view of the top portion, respectively, of the body, in accordance with an embodiment.

FIG. 6A-6D illustrate a variety of shapes and configuration of the guide rail, in accordance with an embodiment.

FIG. 10A-FIG. 10E illustrate backside views of the smartphone device having different backside camera and the LED flash placement configurations, in accordance with an embodiment.

FIG. 11A-FIG. 11E illustrate front views of the universal optical lighting accessory having different optical element placement configurations along the horizontal path of the guide rail, in accordance with an embodiment.

In the appended figures, one or more elements may have the same reference numeral in different figures indicating previously described elements.

DETAILED DESCRIPTION

Embodiments in this disclosure include a universal optical lighting accessory apparatus and solution for a handheld mobile device to 1) provide filtered lighting to the backside high resolution camera without the use or need of additional external power sources or electronic components; 2) provide a dynamic and adjustable optical housing mechanism to support a wide range of smartphone designs having a variety of LED flash placement configurations; and 3) provide a vanity mirror on the backside of the handheld mobile device. Some of these handheld mobile devices include, for example, smartphones, tablets, computing notebooks, personal digital assistance (PDA) and the like that are equipped with a rear-facing camera and LED flash.

Unlike the conventional fill-in flash devices which require a rechargeable power source and electrical components to provide the necessary front-side lighting to take selfie photographs, the novel optical lighting accessory apparatus may include only simple optical components, light-guides, mounting components, and uses the existing hardware and flash lighting already provided on the smartphone, making this less expensive and simple to manufacture, and also key distinction and advantage over conventional fill-in flash devices for smartphones or other smartphone optical accessories. Other advantages of the novel optical lighting accessory apparatus include 1) an easy and flexible attachment to the smartphone, 2) a light-weight, ultra-slim and ultra-compact body to carry or store, 3) a slim profile and sleek body making it ergonomically comfortable when attached to the smartphone 4) a versatile body that is configured to fit many different smartphone bodies and cases; and 5) a dynamically sliding filtered lighting and housing mechanism which is adapted to fit various smartphone LED flash placement configurations without blocking the rear camera.

Figure 1B:
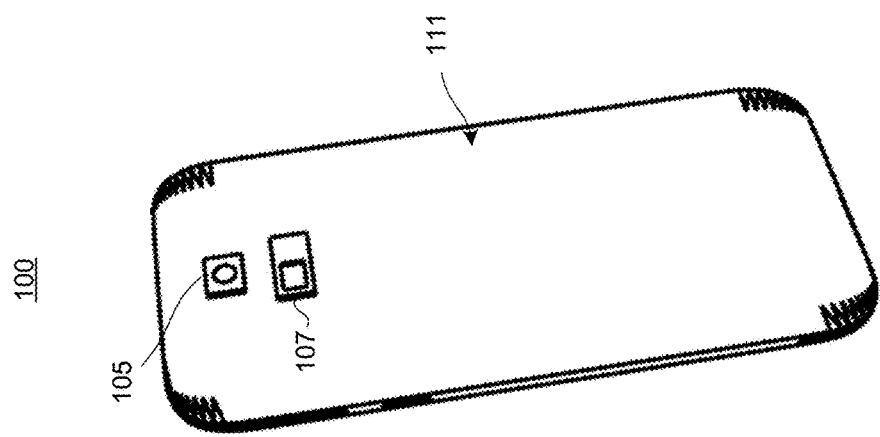
FIG. 1A and FIG. 1B illustrates a front and a rear perspective views of a generic handheld mobile device having built-in camera.
Figure 1A:
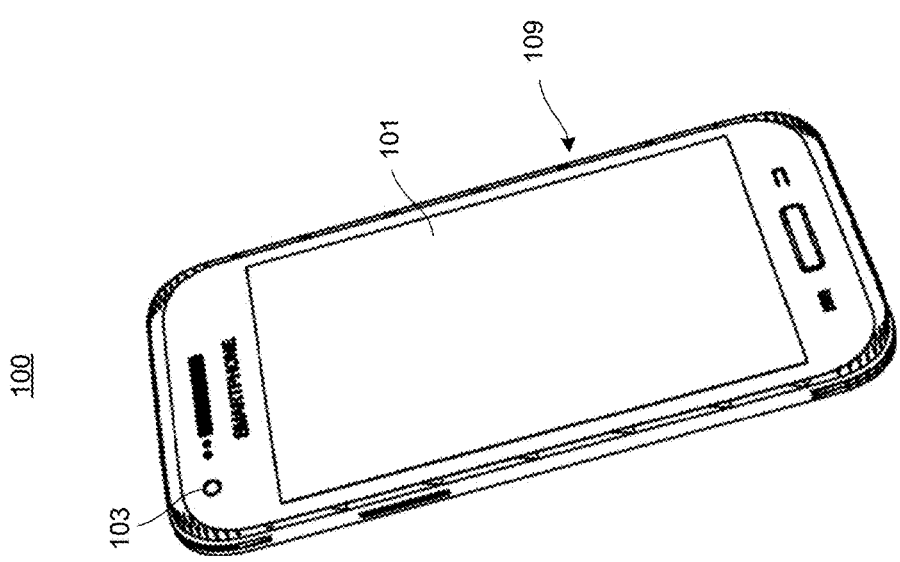
Figure 13:
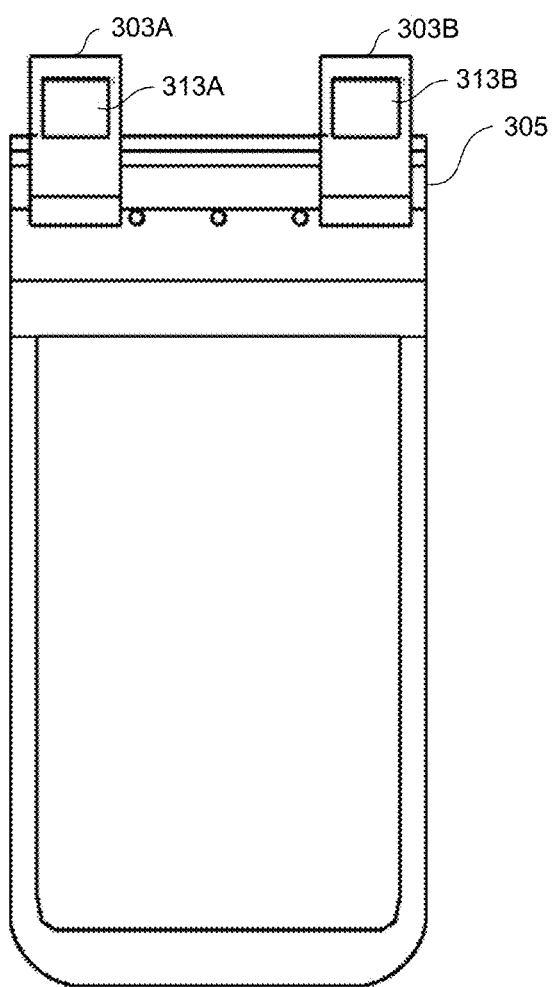
FIG. 13 illustrates a front facing view of the universal optical lighting accessory supporting multiple optical housings, in accordance with an embodiment.

FIG. 1A and FIG. 13 illustrates front and rear perspective views, respectively, of a generic handheld mobile device (e.g., smartphone) 100. As shown in front side view in FIG. 1A, the handheld mobile device 100 may include a touch-screen display 101 for viewing text, graphics, and video, as well as providing input and making selections to various mobile applications ("apps") which are installed on the mobile device 100. The handheld mobile device 100 device may also include a front-side camera 103 located near the top of the mobile device for taking front-facing photographs or videos while a user is facing the touchscreen display 101. In FIG. 13, the backside of the handheld mobile device 100 is shown and may include a backside (or rear-facing) camera 105, having a higher resolution than the front-facing camera 103, and a light source (LED flash) 107. The backside camera 105 may include, for example, high resolution CMOS image sensors, providing higher quality images than that of the front-side camera 103. As used throughout this document and for reference and identification purposes, a front facing side 109 of the handheld mobile device 100 is identified in FIG. 1A and includes the display and front-facing camera, and a rear facing side 111 of the smartphone 100 is identified in FIG. 13 and includes the backside camera 105 and the LED flash 107.

Figure 2:
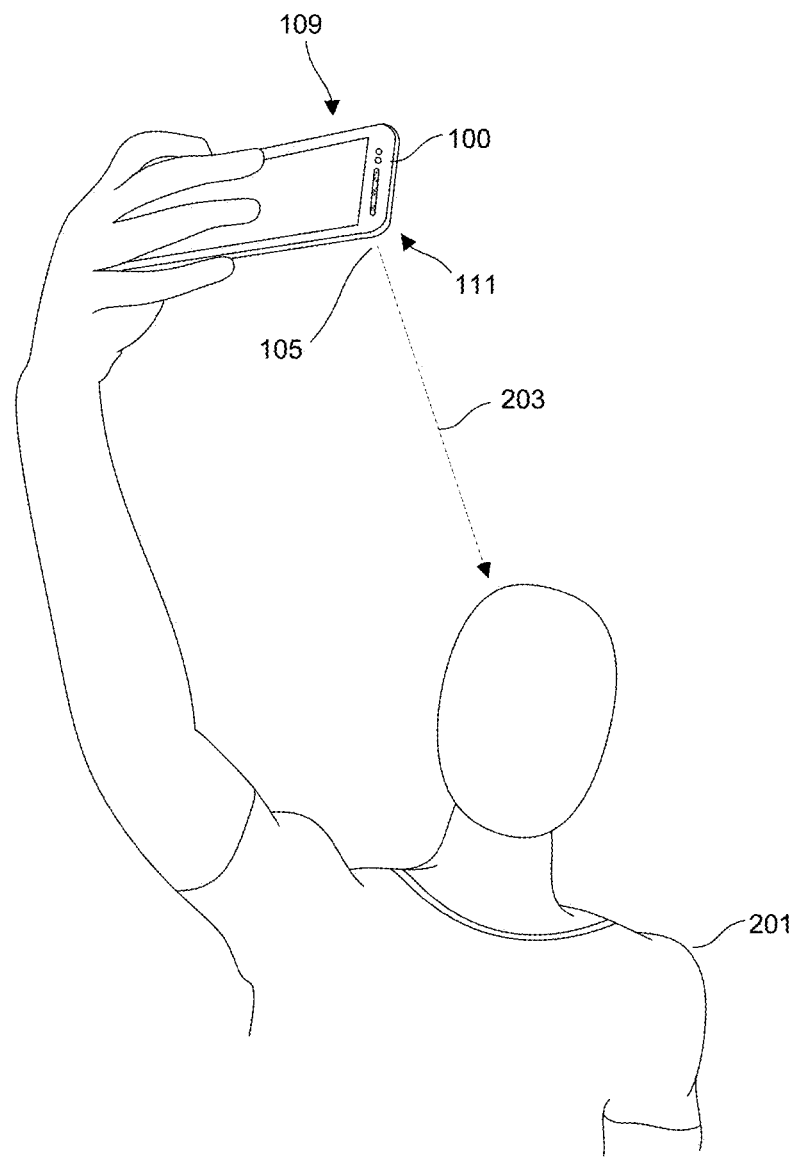
FIG. 2 illustrates an example of a self-portrait photograph or "selfie" by a user using the backside camera of the handheld mobile device.
Figure 3:
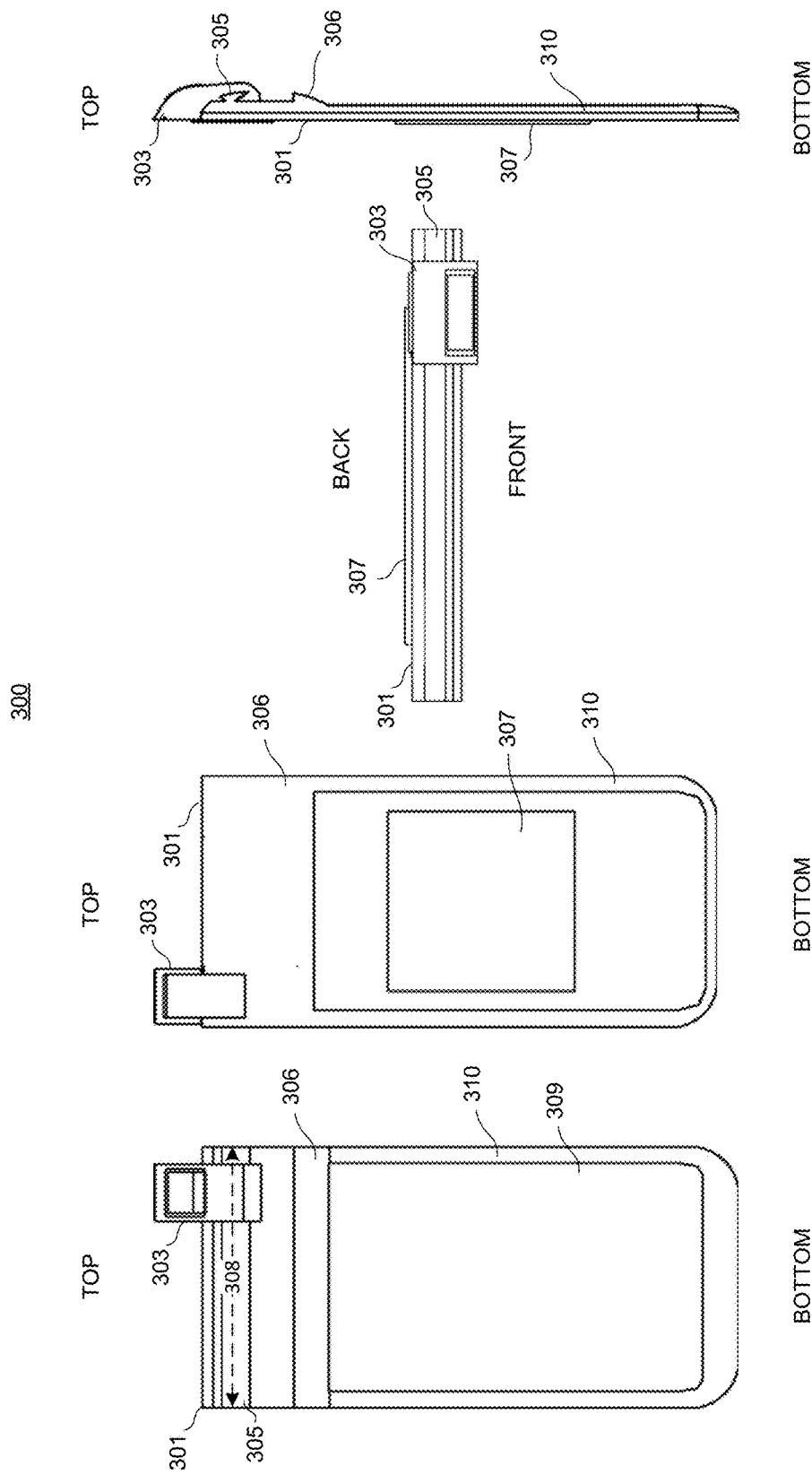
FIG. 3A-FIG. 3D illustrate a front view, a back view, a top view, and side view of a novel optical lighting accessory for providing filtered lighting (or fill-in lighting) to the backside camera of the handheld mobile device, in accordance to an embodiment.

FIG. 2 illustrates an example of a user 201 taking a self-portrait ("selfie") photograph or video while holding the handheld mobile device 100 in their hand at arm's length with the backside camera 105 facing and directed along path 203 so that camera 105 is facing the user 201. In poorly lit environments or at night, taking selfie photographs or videos using the backside camera 105 with the flash enabled can be accomplished by the user 201. However, due to the high intensity and brightness of the LED flash 107, taking selfies at night using backside camera 105 may be difficult, causing discomfort or irritation to the user's eyes while attempting to directly view the backside camera 105 with the LED flash 107 enabled. As presented in this document, the novel optical accessory apparatus overcomes this problem in several ways by using optical and filtered lighting components that allow users to take selfie photos or videos using the backside camera in poorly lit or nighttime environments. For example, the novel optical accessory apparatus is structured to convert the high intensity LED flash 107 into a filtered light source, making it ideal for taking selfies with the backside camera 105 and LED flash 107 at night or in poorly lit areas by providing a uniform and mild intensity light source.

FIG. 3A, FIG. 3B, FIG. 3C, and FIG. 3D illustrate a front view, a back view, a top view, and a side view, respectively, of a universal optical lighting accessory 300 for providing filtered lighting (or fill-in lighting) to the backside camera 105 of the handheld mobile device 100, in accordance with an embodiment. The universal optical lighting accessory 300 includes, for example, a body 301 having a thin profile; an optical housing 303 coupled to a guide rail 305 which is formed on a top portion 306 of the body 301, the optical housing 303 freely slides along a horizontal path 308 along a portion of the guide rail 305; an attachment member 307 formed on the backside of the body 301; and an optional vanity mirror 309 coupled to a bottom portion 310 of the body 301. In practice, the optional vanity mirror 309 may provide additional structural support to the universal optical lighting accessory 300 as well provide an unbreakable and scratch-resistant mirror for self-grooming and self-inspection purposes.

Figure 4:
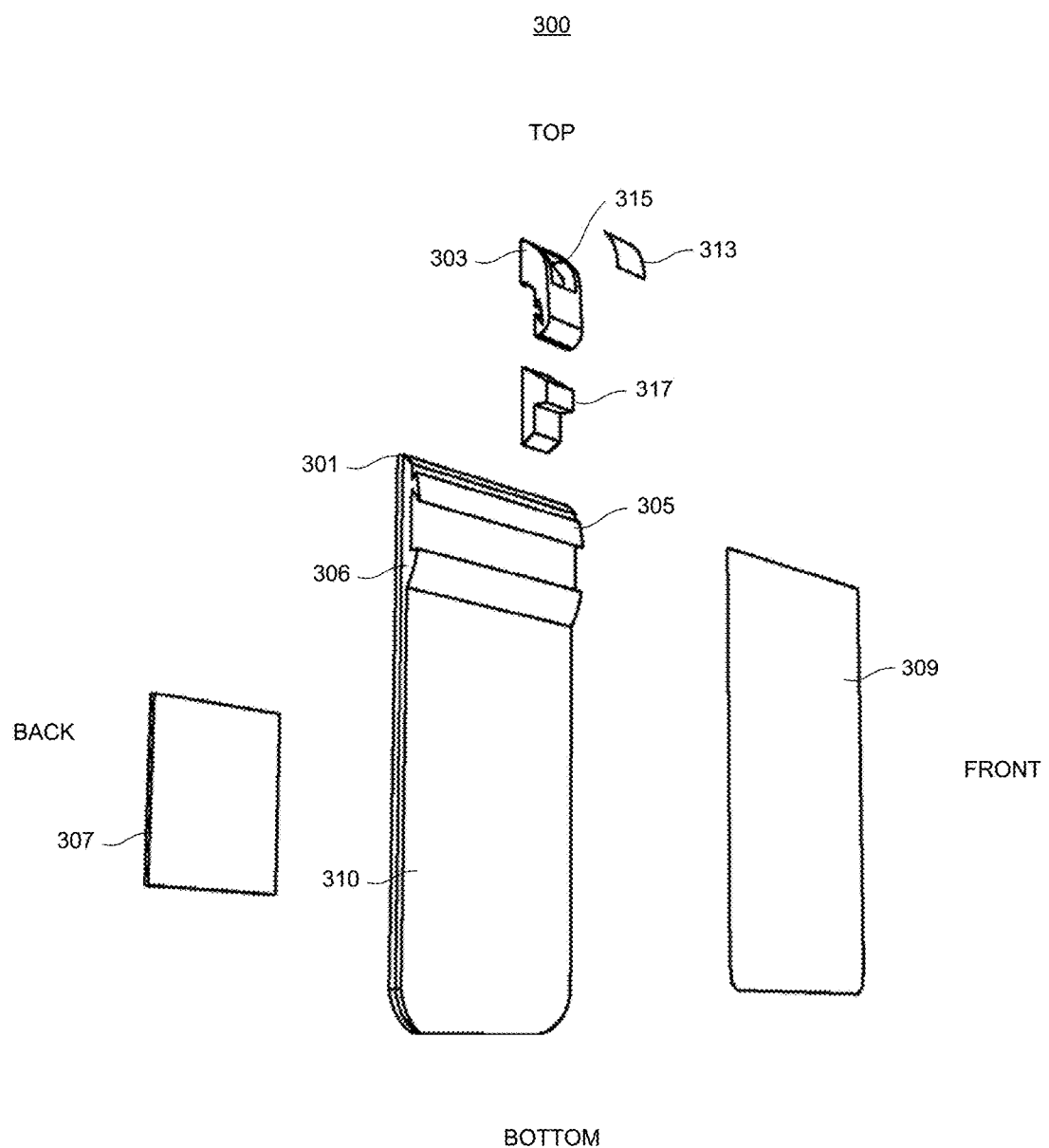
FIG. 4 illustrates an exploded view of the optical lighting accessory, in accordance with an embodiment.

FIG. 4 illustrates an exploded view of the universal optical lighting accessory 300, in accordance with an embodiment. In practice, the body 301 is structured to be thin and smaller than the size of the smartphone 100 so that it may fit comfortably and unobtrusively to the smartphone user when attached to the rear-facing side 111 of the smartphone 100. As shown in FIG. 4, additional elements of the universal optical lighting accessory 300 may include a light filter element 313 coupled to a portion of the cavity 315 formed in the optical housing 303, and an optional optical element 317 coupled to another portion of the cavity formed in the interior of the optical housing 303. Optical members of the universal optical lighting accessory 300 may be configured to filter, diffuse and redirect the light rays from a primary light source (e.g., LED flash 107) and transform the light rays into a different color or convert it to a filtered and uniform state. For example, the light filter element 313 may include a variety of photographic filters such as a diffusion filter to soften and diffuse the light rays, a UV black light filter, or a color filter for transforming the light rays to a specific color (e.g., red, green, blue, yellow, orange, violet, etc.). To redirect the light rays, the optical element 317 of the optical housing 303 may have certain properties that redirect light rays through total internal reflection. Examples of some optical elements 317 may include light pipes, light tubes, optical waveguides and other similar optical components for transporting and guiding light. Materials generally used to fabricate the optical element 317 may include, for example, clear polycarbonate, clear acrylic, glass, or other durable transparent materials. These and other optical members, structure and various embodiments of the universal optical lighting accessory 300 are provided later herein below.

FIG. 5A FIG. 5B, and FIG. 5C illustrate a front full view, a close-up side perspective view of the top portion 306, and a close-up side profile view of the top portion 306, respectively, of the body 301 of the universal optical lighting accessory 300. In another embodiment, the body 301 may include multiple spring-loaded balls or ball plungers that are embedded in the top portion 306 below the guide rail 305. The multiple spring-loaded balls or ball plungers may be applied to specific incremental positions (321A, 321B, 321C, 321D, and 321E) equally distributed along the guide rail 305 and used to set the optical housing 303 at discrete positions along the guide rail 305. As shown in FIG. 5B, the guide rail 305 may include a male interlocking member that is keyed and shaped to fit and support a corresponding female interlocking member formed on the optical housing 303, causing the optical housing 303 to be secured when attached to the keyed portion of the guide rail 305, while still allowing the optical housing 303 to slide freely along the horizontal path 308 of the guide rail 305 when connected. In one implementation, the profile of the keyed male interlocking member of the guide rail 305 may be knife-like in shape as shown in FIG. 5C. In other embodiments, the keyed male interlocking member of the guide rail 305 may be configured in a variety of other shapes. For example, as shown in FIG. 6A-6D, these may include a T-shaped male interlocking member 305A, a semi-circle shaped male interlocking member 305B, an inverted semi-circle shaped male interlocking member 305C, and a C-shaped male interlocking member 305D. It is to be understood that for each male interlocking members shown in FIG. 6A-FIG. 6D, there is a corresponding female interlocking member formed on the optical housing 303 that is configured and shaped to mate with the corresponding male interlocking member, the combination of the two members forming a sliding mechanism. These embodiments presented provide only a few possible configurations and is not intended to limit the scope to other possible interlocking configurations that may be used to couple the optical housing 303 to the guide rail 305.

Figure 7A:
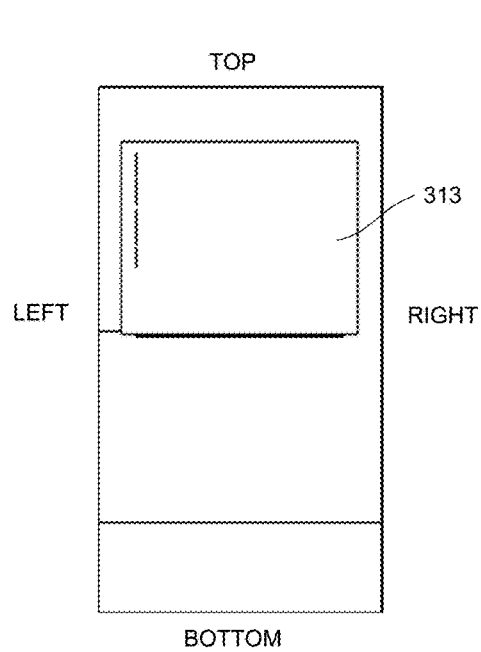
FIG. 7A-FIG. 7D illustrate multiple views of the optical housing, including a front view, a back view, a top view, and a side view, in accordance with an embodiment.
Figure 7B:
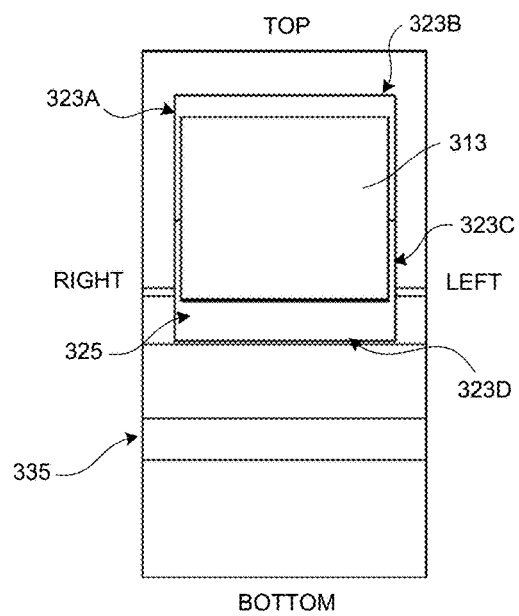
Figure 7C:
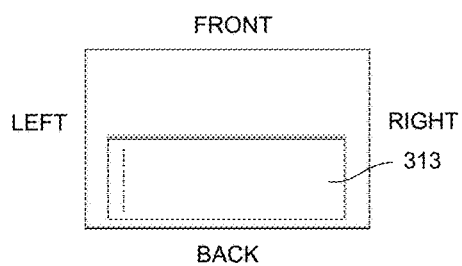
Figure 7D:
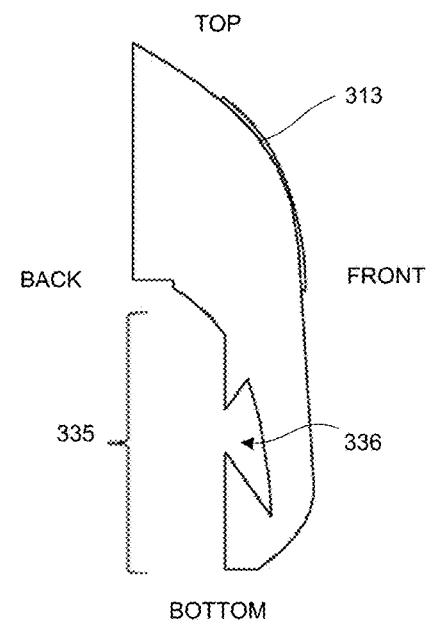

FIG. 7A-FIG. 7D illustrate multiple views of the optical housing 303, including a front view (FIG. 7A), a back view (FIG. 7B), a top view (FIG. 7C), and a side view (FIG. 7D). The optical housing 303 provides many valuable functions to the universal optical lighting accessory 300, including 1) protecting the optional optical element 317 from being scratched, broken or damaged 2) containing the light from the light source 107 to the optical housing 303 and preventing it from escaping from the optical housing 303, and 3) preventing the light source from leaking to the backside camera 105 and exposing the camera's sensor with extra light, causing exposure uniformity problems. In one embodiment, the general side profile of optical housing 303 may appear elephant-like in shape as shown in FIG. 7D. Various parts of the optical housing 303 may include, for example, multiple interior walls (323A, 323B, 323C, and 323D) forming the hollow cavity 315 in a top portion of the interior of the optical housing 303. A section of the hollow cavity 315 may define a rear side opening for a light intake port 325 formed on the backside of the optical housing 303 and a front side opening formed on the front side of the optical housing 303 in which the light filter element 313 may be applied. In addition, the optical housing 303 includes a female interlocking member 335 formed on the back side of the optical housing 303. As shown in this example, the female interlocking member 335 includes a channel 336 formed in the optical housing 303 that is keyed and knife-like in shape to fit into and interlock with a corresponding protruding male interlocking member of the guide rail 305, which is also knife-like in shape and structured to mate with the female interlocking member 335, as shown in FIG. 5C, causing the optical housing 303 to be secured when attached to the male interlocking member of the guide rail 305 while still allowing the optical housing 303 to slide freely along the horizontal path 308 of the guide rail 305 when connected. In this example, the combination of the male and female interlocking members form the sliding mechanism of the universal optical lighting accessory 300.

In yet another embodiment, the multiple interior walls (323A, 323B, 323C, and 323D) may form another portion of the cavity 315 for receiving the optical element 317 when attached. An optional reflective surface may be applied to the multiple interior walls (323A, 323B, 323C, and 323D) to provide additional containment and redirection of the light from the light source 107. In some implementations, materials used to fabricate the optical housing 303 may include, for example, moldable plastics, rubber, metals, or glass. In practice, the optical element 317 may be made to be detachable from the optical housing 303.

Figures 8A, 8B, 8C, 8D:
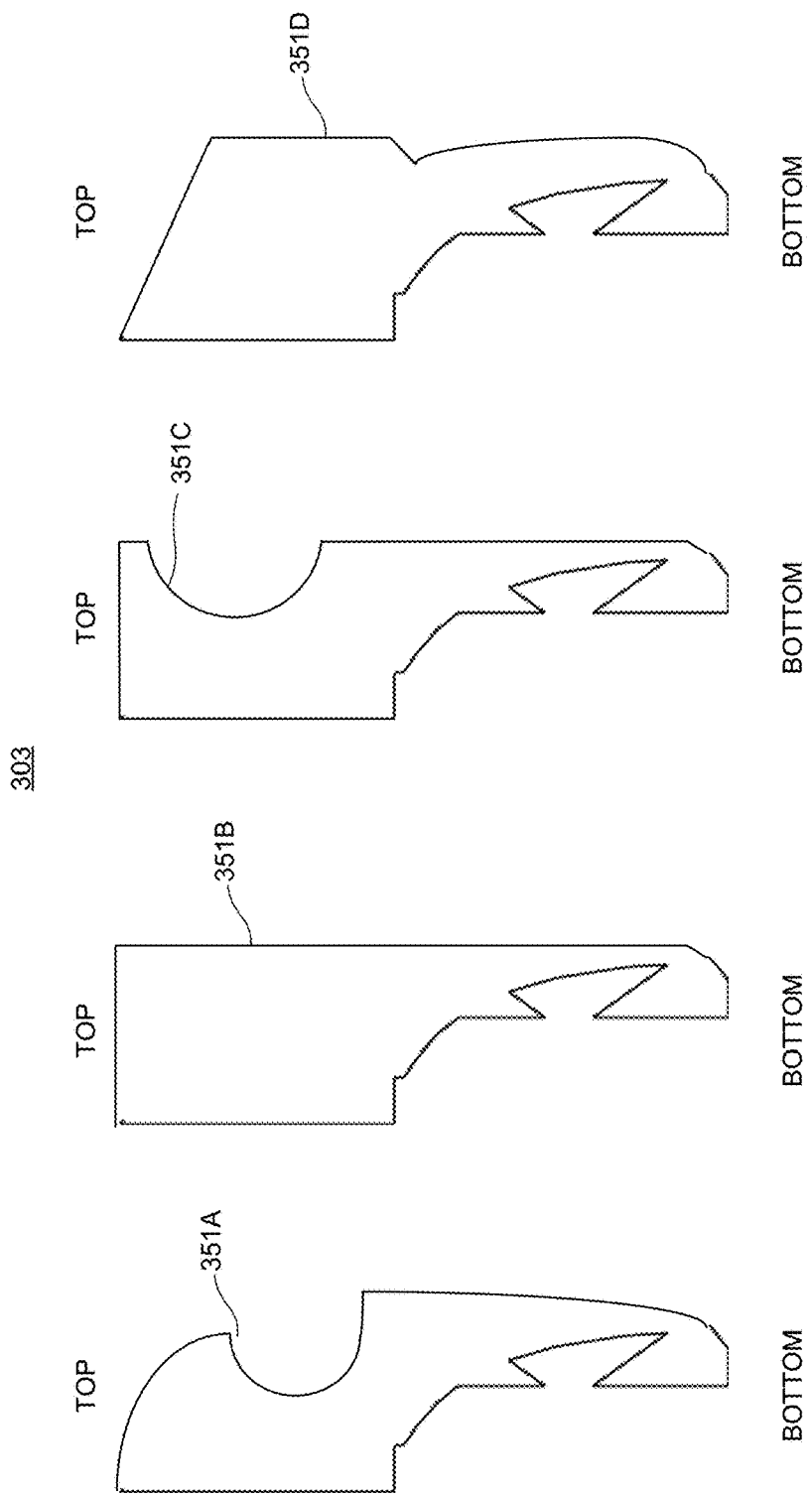
FIG. 8A-8D illustrate side profiles of various types of the optical housing may possess, in accordance with an embodiment.

FIG. 8A-8D illustrate side profiles of other types of shapes the optical housing 303 may possess. For example, the shape of the optical housing 303 may be a C-shaped curved structure 351A as shown in FIG. 8A. In another example, the shape of the optical housing 303 may be a linear-shaped structure 351B as shown in FIG. 8B. Other optical housing examples may include a combination of a non-linear/linear-shaped structure 351C and a tapered structure 351D as shown in FIG. 8C and FIG. 8D, respectively. In one instance, the optical housing 303 may be removed from the guide rail 305 and replaced with other types of the optical housing configurations, including optical housing configurations having different types of photographic filters applied to the light filter element 313 for creating photographic special effects (e.g., softening image, sharpening image, colorizing image, etc.). In another instance, the shape and size of the optical housing 303 may be designed to enhance and focus the light output from the light source 107 by increasing the size of the cavity 315 dimensions and applying additional optics to optical housing 303 including, for example, lenses, gradient filters, color filters, and other light attenuating components.

Figure 9B:
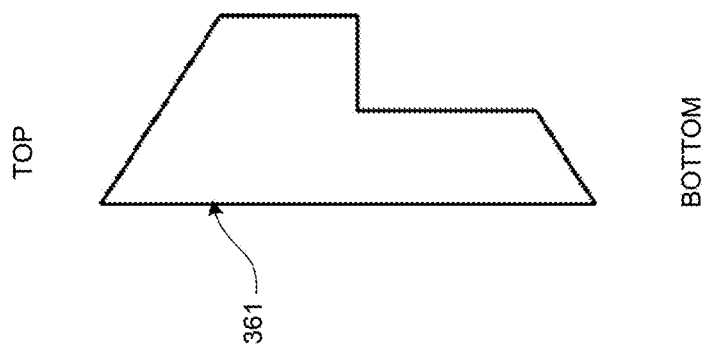
FIG. 9A and FIG. 9B illustrate a perspective view and a side view of the optical element, in accordance with an embodiment.
Figure 9A:
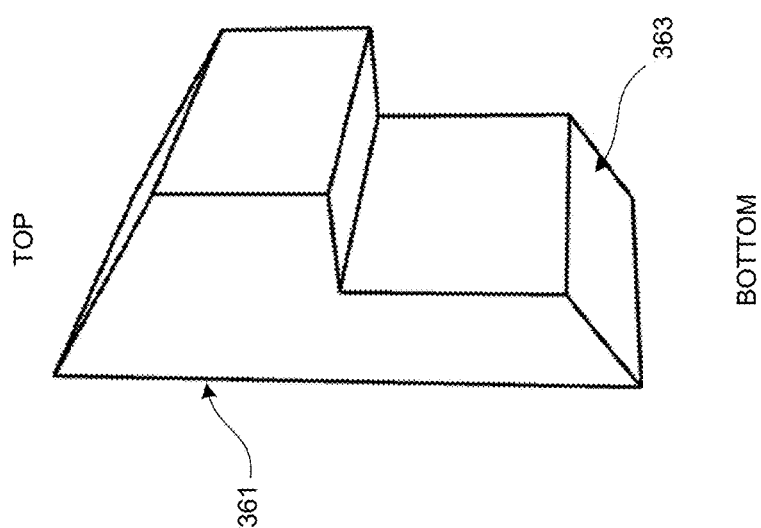

FIG. 9A and FIG. 9B illustrate a perspective view and a side view, respectively, of the optical element 317. These illustrations present the general size, shape and location of the optical element 317 which is in the form of a transparent polyhedron light pipe with 8 faces, each face configured to redirect and guide light from a light input side 361 to a light output side 363, in accordance with an embodiment. In this example, the optical element 317 may include a light intake element having a transparent surface, an intake reflector coated with a reflecting surface, a plurality of light containment and guide walls each coated with reflecting surfaces, and a light output element having a transparent surface. In practice, the optical element 317 may be optionally inserted into a portion of the cavity 315 of the optical housing 303 for redirecting the light source 107 from the light input side 361 to a lower portion of the optical housing 303 and funneling the light to the light output side 363 which is away from the rear-facing camera 105.

FIG. 10A-FIG. 10E illustrate backside views of the smartphone models (100A-100E) having different backside camera 105 and the LED flash 107 placement configurations. Smartphone devices from different manufacturers (or sometimes the same manufacturers) are typically not the same, having different size, camera, and LED flash configurations. Furthermore, the style and layout configurations of the backside camera 105 and LED flash 107 from the different smartphone models often change from one model to next model. For example, in one smartphone model configuration 100A, a backside camera 105A and LED flash 107A of this model may be situated at the top left corner of the smartphone 100A with the backside camera 105A positioned to the left of the LED flash 107A as shown in FIG. 10A. In another smartphone model configuration 100B, a backside camera 105B and LED flash 107B may be situated at the top center of the smartphone 100B with the backside camera 105B positioned to the left of the LED flash 107B as shown in FIG. 10B. In still yet another smartphone model configuration 100C, a backside camera 105C and LED flash 107C may be situated at the top center of the smartphone 100C with the backside camera 105C positioned above the LED flash 107C as shown in FIG. 10C. In another smartphone model configuration 100D, a backside camera 105D and LED flash 107D may be situated at the top center of the smartphone 100D with the backside camera 105D positioned to the right of the LED flash 107D as shown in FIG. 10D. In yet another smartphone model configuration 100E, the backside camera 105E and LED flash 107E may be situated at the top right corner of the smartphone 100E with the backside camera 105E positioned to the right of the LED flash 107E as shown in FIG. 10E.

FIG. 11A-FIG. 11E illustrate front views of the universal optical lighting accessory 300 having different optical element 317 placement configurations along the horizontal path 308 of the guide rail 305. To support and accommodate the wide variety of smartphone models (100A-100E) from different manufacturers (or sometimes from even from the same manufacturers) having different placement configurations of the backside camera and the LED flash as shown in FIG. 10A-FIG. 10E, the universal optical lighting accessory 300 may be dynamically configured to match the different positions of the LED flash on each model by providing the sliding mechanism (as described hereinabove) which allows the optical housing 303 to move freely along the horizontal path 308 of the guide rail 305, allowing a user to dynamically set the position of the optical housing 303 that best suits and matches the smartphone model's LED flash 107 placement configuration. For example, FIG. 11A illustrates the optical housing 303 at a far left position 371A. In practice, when attached to the rear-side of the smartphone 100A, the universal optical lighting accessory 300 with the optical housing 303 at the far left position 371A would best match the smartphone 100A shown in FIG. 10A. Similarly, the optical housing 303 positioned at the left position 371B shown in FIG. 11B would best match the smartphone 100B shown in FIG. 10B. In another example, the optical housing 303 positioned at a center 371C position shown in FIG. 11C would best match the smartphone 100C shown in FIG. 10C. Likewise, the optical housing 303 positioned at a right position 371D shown in FIG. 11D would best match the smartphone 100D shown in FIG. 10D, and the optical housing 303 positioned at a right-most position 371E shown in FIG. 11E would best match and be suited for the smartphone 100E shown in FIG. 10E. As it is apparent by these examples, one key advantage of the universal optical lighting accessory 300 is its ability to easily support a variety of smartphone models having different placement configurations of the backside camera and the LED flash provided by the different manufacturers. In addition and in practice, each configuration provided in FIG. 11A-FIG. 11E may allow the optical housing 303 to properly cover and capture the light rays from the light source 107 without blocking or obstructing the field of view of the backside camera 105.

Figure 12:
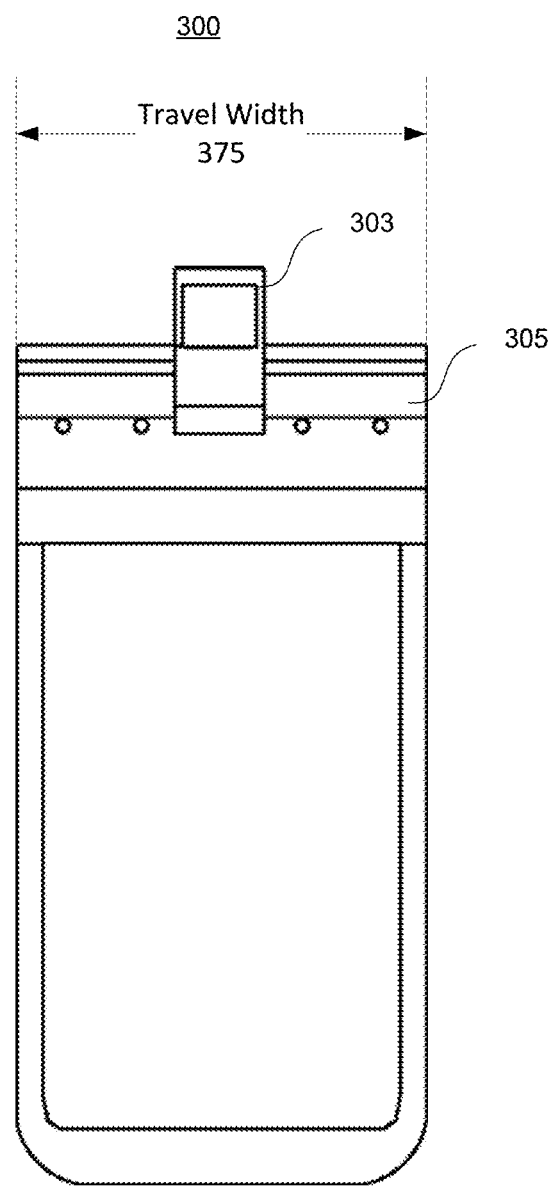
FIG. 12 illustrates a front facing view of the universal optical lighting accessory and a travel width of the optical housing along the guide rail, in accordance with an embodiment.

FIG. 12 illustrates a front facing view of the universal optical lighting accessory 300 and a travel distance to which the optical housing 303 is confined, in accordance to another embodiment. To accommodate the various positions and placement configurations of the LED flash 107 from different smartphone models, the universal optical lighting accessory 300 may have a travel width 375, which is defined as the width of the guide rail 305 along which the optical housing 303 slides and travels, of approximately 30 mm-80 mm.

FIG. 13 illustrates a front facing view of the universal optical lighting accessory 300 supporting multiple optical housings (303A, 303B), in accordance to another embodiment. The guide rail 305 may support multiple optical housings (303A, 303B) to accommodate optical housings with different types of light filter elements and housing configuration types. For example, one of the optical housings 303A may include a diffusion filter 313A while the other optical housing 303B may include a color filter 313B. In practice, having multiple optical housings (303A, 303B) may allow the user to easily transform the output of the light source 107 from one filter type to another filter type by sliding the desired housing type (303A or 303B) in front of the light source 107.

Figure 14B:
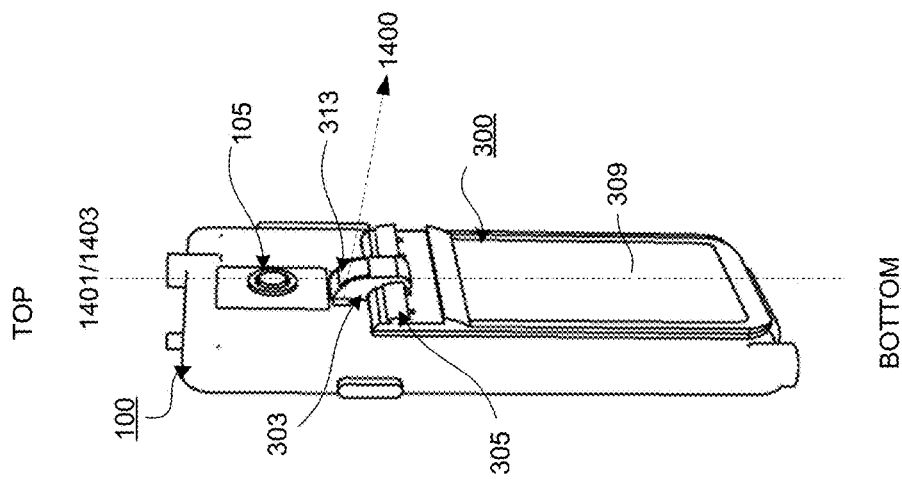
FIG. 14A and FIG. 14B illustrate two perspective views of the smartphone device and the universal optical lighting accessory, including a rear perspective view, and a rear perspective view with the universal optical lighting accessory attached to the smartphone device, in accordance with an embodiment.
Figure 14A:
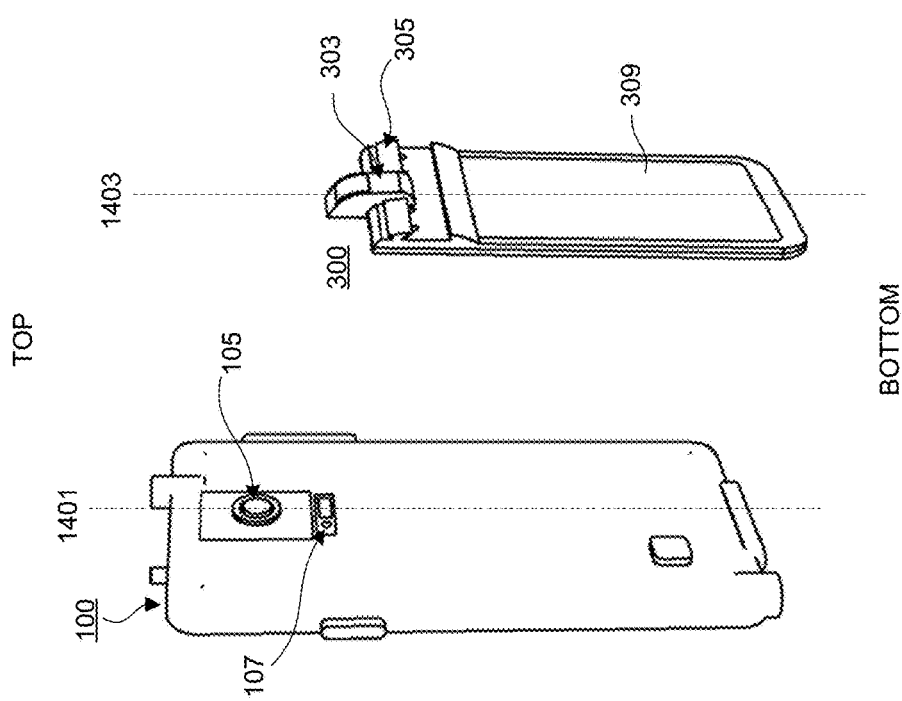

FIG. 14A and FIG. 14B illustrate two perspective views of the smartphone device 100 and the universal optical lighting accessory 300, including a rear perspective view (FIG. 14A), and a rear perspective view with the universal optical lighting accessory 300 attached to the smartphone device 100 (FIG. 10B), in accordance to another embodiment. As shown in FIG. 14A, the backside camera 105 and the LED flash 107 of the smartphone device 100 are both visible in this view. Also shown is the universal optical lighting accessory 300 which is slightly pulled forward and with its backside facing the backside camera 105 and the LED flash 107. Upon enabling the LED flash 107 of the smartphone device 100, light rays 1400 emitted from the LED flash 107 is transmitted to the light intake port 325 of the optical housing 303 along the path of the light rays 1400 to the light filter element 313, producing filtered lighting for the backside camera 105 as shown in FIG. 14B. In practice, the universal optical lighting accessory 300 may be attached directly to the backside 111 of the smartphone device 100 so that the optical housing 303 completely covers the LED flash 107. In practice, to properly mount and align the universal optical lighting accessory 300 to the smartphone 100, a vertical centerline 1401 of the smartphone 100 coincides with the vertical centerline 1403 of the universal optical lighting accessory 300, as shown in FIG. 14B. Types of attachment members 307 used to secure and mount the universal optical lighting accessory 300 to the backside 111 of the smartphone 100 may include, but is not limited to, adhesive tapes, loop and hooks fasteners, clips, straps, and clamps.

Figure 15:
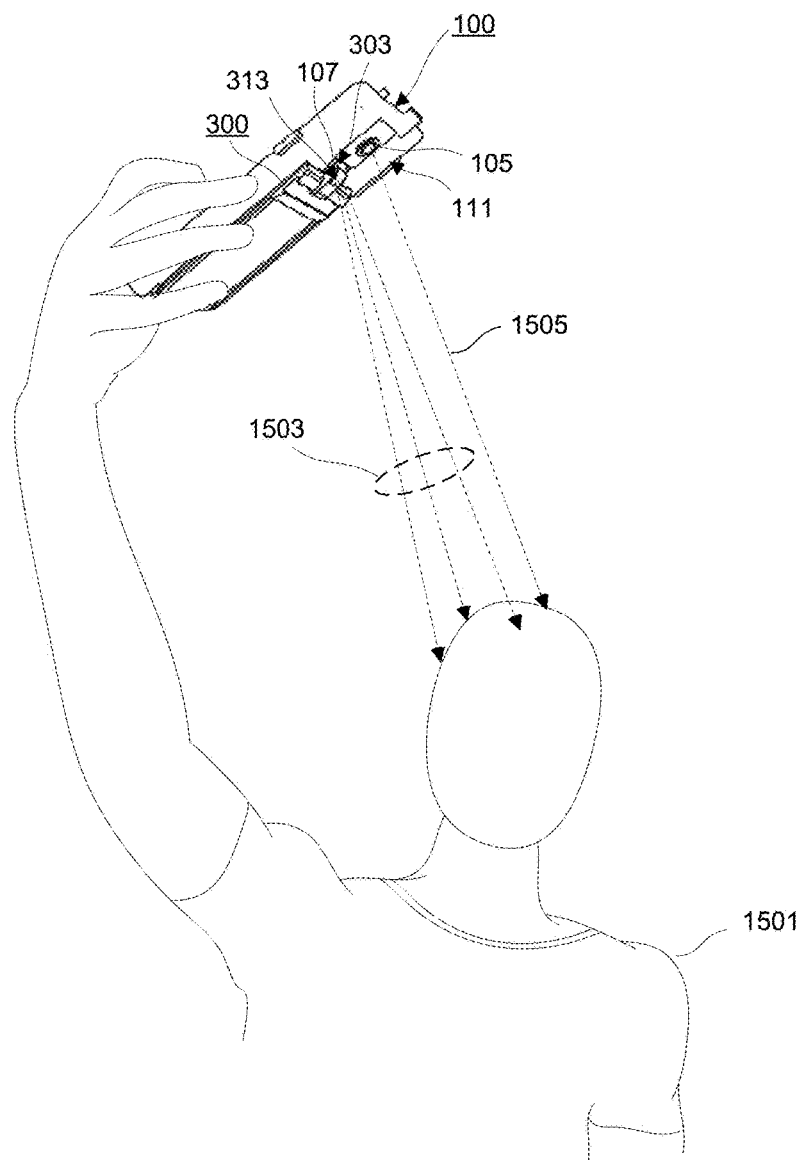
FIG. 15 illustrates a basic implementation of the universal optical lighting accessory attached to the rear facing side of the smartphone device while a user is taking a selfie photograph or video, in accordance with an embodiment.

FIG. 15 illustrates a basic implementation of the universal optical lighting accessory 300 attached to the rear facing side 111 of the smartphone device 100 while a user 1501 is taking a selfie photograph or video using the backside camera 105. In this example, the optical housings 303 is aligned to the LED flash 107 so that a filtered light (or fill-in lighting) 1503 is formed through the light filter element 313 is projected toward the user 1501 by the universal optical lighting accessory 300 when the LED flash 107 is enabled on the smartphone device 100, providing adequate filtered lighting and exposure to the backside camera 105 pointing in the direction along path 1505 that is facing the user 1501.

The optical lighting accessory may be constructed to meet different requirements affecting functional performance metrics, visual appeal, cost, and durability. For example, to provide adequate fill-in lighting in photography and video applications, depending on the application and use by the user 1501, different types and sizes of light filter elements 313 and optical elements 317 of the universal optical lighting accessory 300 may be implemented which may improve or enhance the coverage, range, and performance of the filtered light 1503 provided by the universal optical lighting accessory 300.

Figure 16E:
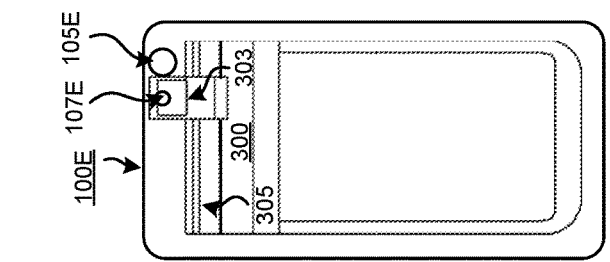
FIG. 16A-FIG. 16E illustrate images of a prototype of the universal optical lighting accessory attached and dynamically configured to fit the various types of smartphone having different backside camera and LED flash placement configurations, in accordance with an embodiment.
Figure 16D:
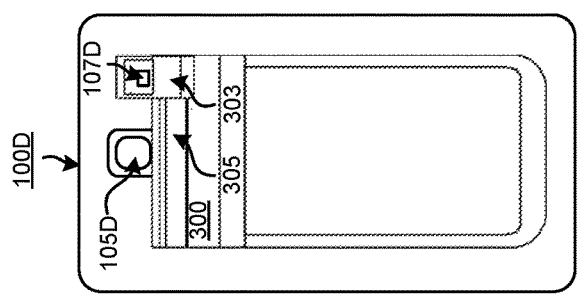
Figure 16C:
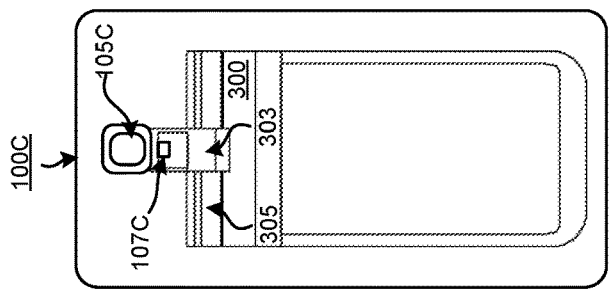
Figure 16B:
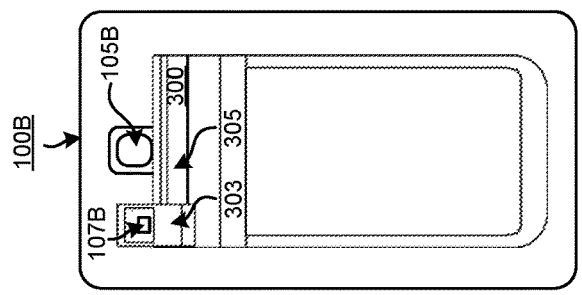
Figure 16A:
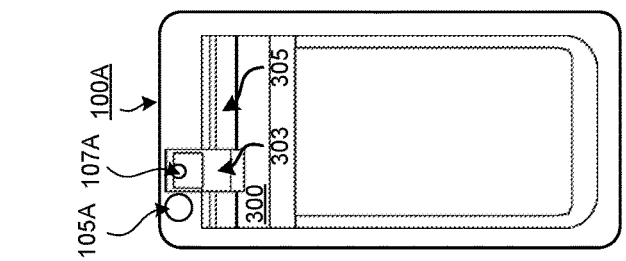

FIG. 16A-FIG. 16E illustrate images of a prototype of the universal optical lighting accessory 300 attached and dynamically configured to fit the various smartphone models (100A-100E) having different backside camera and LED flash placement configurations as previously presented. In FIG. 16A, the universal optical lighting accessory 300 may be attached to the backside of the smartphone model 100A having the backside camera 105A and the LED flash 107A located near the upper left corner of the smartphone model 100A. To fit and match the smartphone model 100A, the optical housing 303 of the universal optical lighting accessory 300 may be mechanically adjusted and engaged to a first placement setting defined by incremental position 321B by sliding the optical housing 303 along the guide rail 305 and to the far left of the guide rail 305 so that the light intake port 325 of the optical housing 303 is applied directly over the LED flash 107A of the smartphone model 100A. In FIG. 16B, the universal optical lighting accessory 300 is attached to the backside of the smartphone model 100B having the backside camera 105B and the LED flash 107B both located near the upper center of the smartphone model 100B, the LED flash 107B situated to the left side of the backside camera 105B. To fit and match the smartphone model 100B, the optical housing 303 of the universal optical lighting accessory 300 may be mechanically adjusted and engaged to a second placement setting defined by incremental position 321A by sliding the optical housing 303 along the guide rail 305 and to the left of center of the guide rail 305 so that the light intake port 325 of the optical housing 303 is applied directly over the LED flash 107B of the smartphone model 100B. In FIG. 16C, the universal optical lighting accessory 300 is attached to the backside of the smartphone model 100C having the backside camera 105C and the LED flash 107C both located near the upper center of the smartphone model 100C, the LED flash 107B situated below the backside camera 105C. To fit and match the smartphone model 100C, the optical housing 303 of the universal optical lighting accessory 300 may be mechanically adjusted and engaged to a third placement setting defined by incremental position 321C by sliding the optical housing 303 along the guide rail 305 and to the center of the guide rail 305 so that the light intake port 325 of the optical housing 303 is applied directly over the LED flash 107C of the smartphone model 100C. In FIG. 16D, the universal optical lighting accessory 300 is attached to the backside of the smartphone 100D having the backside camera 105D and the LED flash 107B both located near the upper center of the smartphone model 100D, the LED flash 107D situated to the right side of the backside camera 105D. To fit and match the smartphone model 100D, the optical housing 303 of the universal optical lighting accessory 300 may be mechanically adjusted and engaged to a fourth placement setting defined by incremental position 321E by sliding the optical housing 303 along the guide rail 305 and to the right of center of the guide rail 305 so that the light intake port 325 of the optical housing 303 is applied directly over the LED flash 107D of the smartphone model 100D. In FIG. 16E, the universal optical lighting accessory 300 is attached to the backside of the smartphone model 100E having the backside camera 105E and the LED flash 107E located near the upper right corner of the smartphone model 100E. To fit and match the smartphone model 100E, the optical housing 303 of the universal optical lighting accessory 300 may be mechanically adjusted and engaged to a fifth placement setting defined by incremental position 321D by sliding the optical housing 303 along the guide rail 305 and to the far right of the guide rail 305 so that the light intake port 325 of the optical housing 303 is applied directly over the LED flash 107E of the smartphone model 100E. In practice, it is worth noting that the optical housing 303 or any other components of the universal optical lighting accessory 300, when properly applied to the smartphone 100, does not block or obstruct the field of view of the backside camera.

Figure 17:
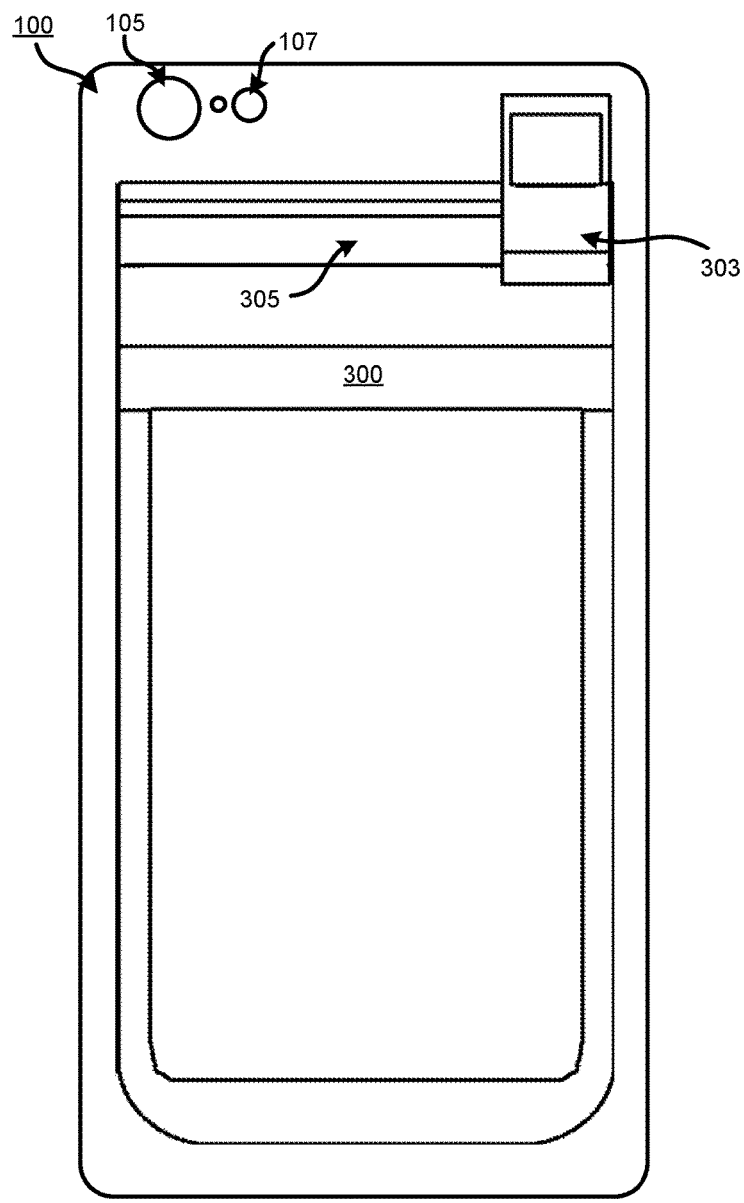
FIG. 17 illustrates an image of another configuration of the universal optical lighting accessory prototype attached to the rear facing side of the smartphone, in accordance with an embodiment.

FIG. 17 illustrates an image of another configuration of the universal optical lighting accessory 300 prototype attached to the rear facing side of the smartphone 100, according to an embodiment. In some instances, the user may wish to leave the LED flash 107 unobstructed from the optical housing 303 so that full intensity of the LED flash 107 may be realized. To address this particular scenario, the user may adjust the optical housing 303 by sliding it along the guide rail 305 so that is out of the way and does not obstruct the flash 107, providing the user the full light intensity generated by the flash 107.

Figure 18:
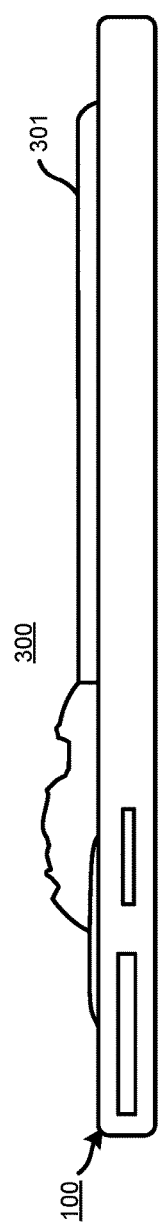
FIG. 18 illustrates an image of a side profile view of the universal optical lighting accessory prototype attached to the rear facing side of the handheld mobile device, in accordance with an embodiment.

FIG. 18 illustrates a side profile view of the universal optical lighting accessory 300 prototype attached to the rear facing side of the smartphone 100. For example, the body 301 may have a thickness as than or less than 3 mm, resulting in a very thin and narrow profile. When attached to the smartphone 100, the narrow profile and generally structurally conforming body 301 of the universal optical lighting accessory 300 provides the user a comfortable and unobtrusive feel, having an aesthetic and sleek design that conforms to the contours of the smartphone 100.

As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. A universal optical lighting accessory for use with a plurality of different handheld mobile devices each having a front side, a backside, a rear-facing camera located on the backside, and a light source located on the backside, wherein each of the plurality of different handheld mobile devices has a different light source placement configuration, the universal optical lighting accessory comprising:
   a body;

an attachment member for coupling and securing the body to the backside of the plurality of different handheld mobile devices;

a guide rail coupled to body;

an optical housing slidably coupled to the guide rail, wherein the optical housing is mechanically adjustable to engage the different light source placement configuration and receive a plurality of light rays communicated by the light source of the plurality of different handheld mobile devices; and a light filter element coupled to the optical housing, wherein the light filter element transforms the plurality of light rays communicated by the light source into a filtered light source, wherein the light filter element is configured to communicate the filtered light source to the rear-facing camera of the plurality of different handheld mobile devices.

2. The universal optical lighting accessory of claim 1 further comprising an optical element coupled to an interior cavity formed in the optical housing.

3. The universal optical lighting accessory of claim 2, wherein the optical element is a transparent polyhedron light pipe.

4. The universal optical lighting accessory of claim 1, wherein the light source is an LED flash.

5. The universal optical lighting accessory of claim 1, wherein the optical housing includes a first interlocking mechanism configured to interlock to a second interlocking mechanism formed on the guide rail.

6. The universal optical lighting accessory of claim 1, wherein the optical housing is configured to protect the optical element from being scratched, broken or damaged, confine the light source to the optical housing and prevent it from escaping from the optical housing, and prevent the light source from leaking to the rear-facing camera.

7. The universal optical lighting accessory of claim 1 further comprising a plurality of ball plungers used for setting the optical housing to a discreet incremental position defined along the guide rail.

8. The universal optical lighting accessory of claim 1, wherein an auxiliary optical housing is coupled to the guide rail.

9. The universal optical lighting accessory of claim 8, wherein a first filter type is applied to the optical housing and a second filter type is applied to the auxiliary optical housing.

10. The universal optical lighting accessory of claim 1, wherein the light filter element includes a diffusion filter, a UV black light filter, a color filter, or a combination thereof.

11. The universal optical lighting accessory of claim 1, wherein the attachment member includes an adhesive tape, a loop and hook fastener, a plurality of clips, a plurality of straps, a plurality of clamps, or a combination thereof.

12. The universal optical lighting accessory of claim 1, wherein the body has a thickness of less than 3 mm providing a slim profile.

13. The universal optical lighting accessory of claim 1, wherein the universal optical lighting accessory is used for selfie photography or selfie videography.

14. The universal optical lighting accessory of claim 1, wherein the different light source placement configuration includes a first light source placement, the first light source placement located at an upper left corner defined on a first handheld mobile device; a second light source placement, the second light source placement located near a point slightly left of an upper center point defined on a second handheld mobile device; a third light source placement, the third light source placement located near an upper center point defined on a third handheld mobile device, a fourth light source placement, the fourth light source placement located near a point slightly right of the upper center point defined on a fourth handheld mobile device; and a fifth light source placement, the fifth light source placement located at an upper right corner defined on a fifth handheld mobile device.

15. The universal optical lighting accessory of claim 1, wherein a centerline of the body coincides and aligns with a centerline defined on each of the plurality of different handheld mobile devices.

16. The universal optical lighting accessory of claim 1 further comprising a vanity mirror coupled to a lower portion of the body.

17. The universal optical lighting accessory of claim 1, wherein the plurality of different handheld mobile device includes a smartphone, a tablet, and a laptop.

* * * * *